US005606442A

United States Patent [19]
Bos et al.

[11] Patent Number: 5,606,442
[45] Date of Patent: Feb. 25, 1997

[54] LOW ELECTRO-OPTIC THRESHOLD LIQUID CRYSTAL CELL AND METHOD OF FABRICATING SAME

[75] Inventors: Philip J. Bos, Beaverton; Jolly A. Rahman, Portland, both of Oreg.

[73] Assignee: Tektronix, Inc., Wilsonville, Oreg.

[21] Appl. No.: 407,794

[22] Filed: Mar. 21, 1995

Related U.S. Application Data

[63] Continuation of Ser. No. 63,180, May 14, 1993, abandoned.

[51] Int. Cl.$^6$ .............................. G02F 1/13; G02F 1/136
[52] U.S. Cl. ................................................ 349/179; 349/88
[58] Field of Search ................................. 359/51, 52, 99, 359/102

[56] References Cited

U.S. PATENT DOCUMENTS

| 4,780,240 | 10/1988 | Emoto et al. | 252/299.6 |
| 5,189,540 | 2/1993 | Nakamura et al. | 359/99 |

FOREIGN PATENT DOCUMENTS

| 62-153821 | 7/1987 | Japan | 359/102 |
| 4-119320 | 4/1992 | Japan | 359/102 |
| 5-107525 | 4/1993 | Japan | 359/99 |

OTHER PUBLICATIONS

Doane et al., "Current Trends in Polymer Dispersed Liquid Crystals", IEEE, 1991, pp. 175–178.

Shimada et al, "Control of Polymer Orientation in Polymer Dispersed Liquid Crystal (PDLC)," *Jpn. J. Appl. Physics*, vol. 31, Mar. 15, 1992, pp. L352–L354.

Hikmet, "Anisotropic gels and plasticized networks formed by liquid crystal molecules," *Liquid Crystals*, 1991, vol. 9, No. 3, 405–416.

Yang et al., *Conference Record of 1991 IDRC*, 1991, p. 49.

*Primary Examiner*—William L. Sikes
*Assistant Examiner*—Charles Miller
*Attorney, Agent, or Firm*—Paul S. Angello; John D. Winkelman

[57] ABSTRACT

A photocurable polymer precursor added to a liquid crystal material polymerizes to form a mixture that significantly lowers the threshold and saturation voltages of a standard twisted nematic cell. The performance characteristics of the resulting display device resembles those of a device with a very high pretilt, thereby providing an economical method of fabricating liquid crystal cells of a type that require a high pretilt alignment. The presence of the polymer substantially reduces adverse ion-related effects such as optical droop and charge retention in the liquid crystal display device.

14 Claims, 4 Drawing Sheets

VOLTAGE (R.M.S., 1KHz, SINEWAVE)
THRESHOLD CURVES OF BIPHENYL
EUTECTICS AT 20°C AT NORMAL INCIDENCE

1. E24LV IN A 12μm 5.5°SiO ALIGNED CELL
2. E24LV IN A 10μm PVA ALIGNED CELL
3. E25LV IN A 7μm PVA ALIGNED CELL
4. E8 IN A 7μm PVA ALIGNED CELL
5. E7 IN A 7μm PVA ALIGNED CELL
6. E26M IN A 7μm PVA ALIGNED CELL

LOW ELECTRO-OPTIC THRESHOLD LIQUID CRYSTAL CELL AND METHOD OF FABRICATING SAME

This is a continuation of application Ser. No. 08/063,180 filed May 14, 1993 which is now abandoned.

TECHNICAL FIELD

The present invention relates to liquid crystal cells and methods of fabricating them and, in particular, to a method of fabricating a liquid crystal cell whose electro-optic threshold is lower than the characteristic electro-optic threshold of the liquid crystal material contained within the cell.

BACKGROUND OF THE INVENTION

Reducing the electro-optic threshold of a liquid crystal device facilitates a reduction in the drive voltage required to switch the cell between optical states. For example, the electro-optic threshold of a standard twisted nematic device is about 2.0 volts. This threshold voltage is characteristic of the liquid crystal material contained in the cell.

In the past, two approaches have been taken to reduce the drive voltages of standard twisted nematic cells. One approach entails the use of high dielectric constant liquid crystal material with low elastic constants, and the other entails the use of a high pretilt alignment. FIG. 1 shows the electro-optic threshold curves for six standard twisted nematic cells fabricated with combinations of liquid crystal material and alignment techniques. (The liquid crystal materials identified are manufactured by Merck.) As an example, curves 1 and 2 represent cells filled with the same liquid crystal material, curve 1 indicating the performance with a high pretilt silicon monoxide (SiO) alignment and curve 2 indicating the performance with a low pretilt polyvinyl alcohol (PVA) alignment. The higher pretilt results in about a 0.6 volt lower electro-optic threshold.

Neither of these approaches is desirable for the following reasons. The high dielectric constant material introduces higher ion solubility that manifests itself as an image sticking effect in active matrix addressed displays. The higher pretilt alignment is achieved by evaporated alignment, which is neither an easy nor an economical process.

What is needed, therefore, is a liquid crystal cell that can operate in an image display system as a switch that changes optical states in response to relatively low applied drive voltages.

SUMMARY OF THE INVENTION

An object of the present invention is, therefore, to provide a liquid crystal cell that has a relatively low electro-optic threshold and is useful in image display applications.

Another object of the invention is to provide an economical method of fabricating such a cell.

The present invention produces a significant lowering of the electro-optic threshold of a liquid crystal cell by doping a liquid crystal material with a photocurable polymer precursor and applying a voltage to the cell during the photocuring process. In a preferred embodiment, the process entails adding a photocurable monomer to the liquid crystal material and specifying curing conditions to significantly lower the drive voltage of standard twisted nematic cells. Adding the photocurable polymer precursor to the liquid crystal material significantly reduces the drive voltage, typically from 2.2 volts to 1.2 volts. The voltage reduction is consistent with a pretilt angle increase during the polymerization process of the photocurable monomer because the resultant lowering of electro-optic threshold is similar to that achieved with silicon monoxide evaporation.

Liquid crystal displays fabricated in accordance with the invention can exhibit at least one of two advantages. A first advantage is that the technique can be used to make displays that currently require the expensive process of achieving higher pretilt angles, e.g., super twisted nematic, polyimide cell, super birefringence effect, and ferroelectric displays. A second advantage is that the use of the polymer precursor apparently traps or shields ions to reduce ion-related problems in the display. Thus, the technique is applicable to the fabrication of active matrix displays, which require low drive voltages and have a low tolerance for ion-related problems.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
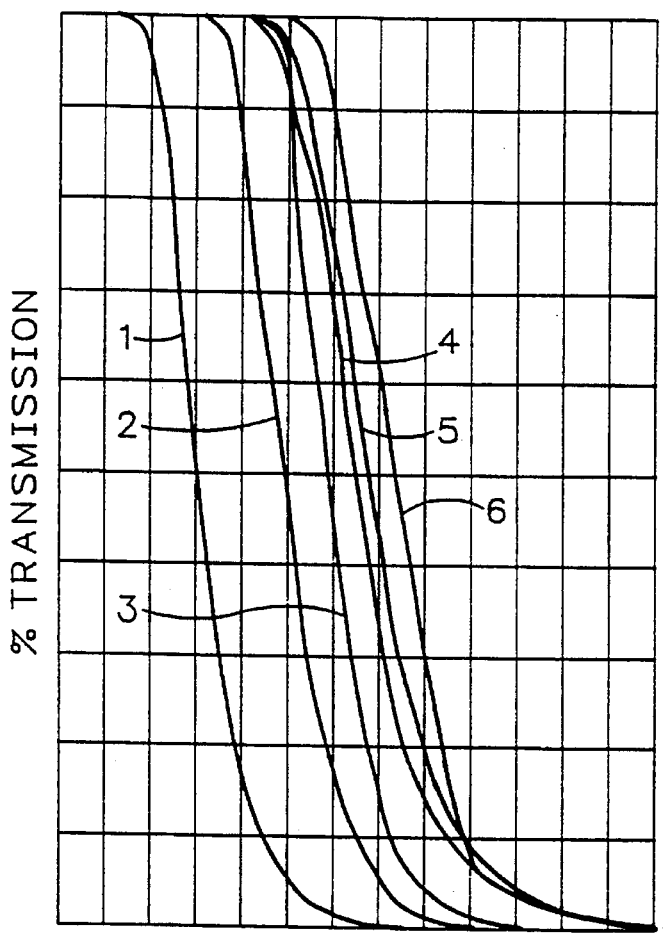
FIG. 1 is a graph showing the comparative relationships of the electro-optic responses of six standard twisted nematic cells fabricated using different prior art alignment techniques and liquid crystal material formulations and processing.
Figure 2:
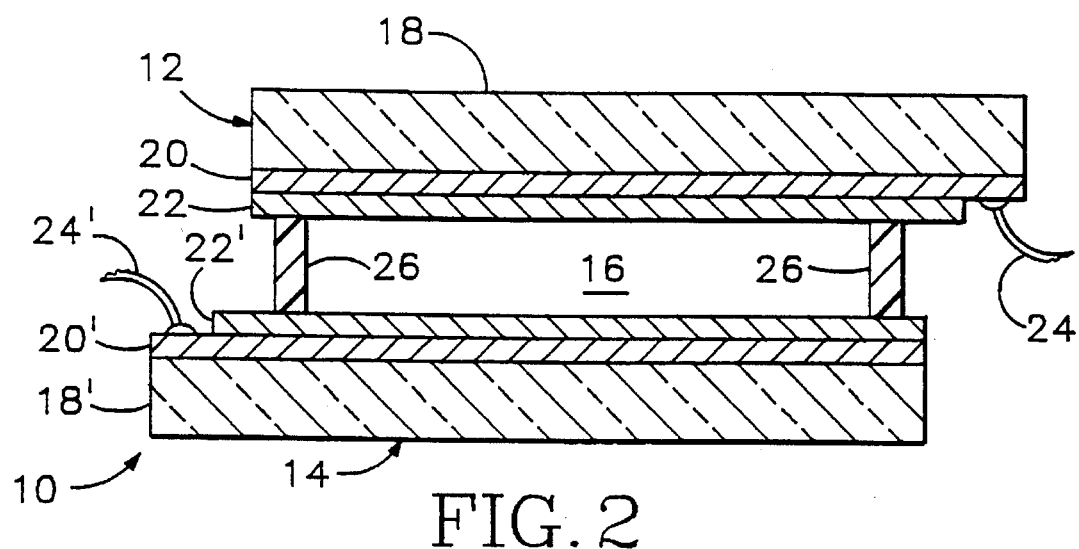
FIG. 2 shows in cross section a side elevation view of certain component parts of a liquid crystal cell fabricated in accordance with the invention.

FIG. 2 shows a liquid crystal cell 10 that is fabricated in accordance with the present invention. With reference to FIG. 2, liquid crystal cell 10 includes a pair of generally parallel, spaced-apart electrode structures 12 and 14 that contain a mixture 16 of a nematic liquid crystal material and a polymer material. Mixture 16 comprises a prescribed mixture of liquid crystal and photocurable polymer precursor materials cured by ultraviolet light with a voltage applied across electrode structures 12 and 14. Electrode structure 12 comprises a glass dielectric substrate 18 that has on its inner surface a layer 20 of electrically conducting, but optically transparent, material such as indium tin oxide. Conductive layer 20 is preferably overcoated with a layer of silicon dioxide (not shown).

A director alignment film layer 22 of polyimide material is applied to conductive layer 20 and forms a boundary between electrode structure 12 and mixture 16 of the liquid crystal and polymer materials. The surface of film 22 that contacts the liquid crystal material is rubbed to form a pretilt angle of the directors of the liquid crystal material in contact with film 22. Film 22 is rubbed to produce a pretilt angle preferably of between about 3° and 10° relative to the surface of film 22. Electrode structure 14 is of a construction similar to that of electrode structure 12, and the components corresponding to those of electrode structure 12 are identified with identical reference numerals followed by primes.

The short length side margins of electrode structures 12 and 14 are offset relative to each other to provide access to conductive layers 20 and 20' for connecting at terminals 24 and 24' the output conductors of a suitable driver (not shown). Spacers 26 may be of any suitable material such as glass fiber to preserve the generally parallel relation between electrode structures 12 and 14.

The cells 10 presented below as examples to demonstrate the invention were made with a silicon dioxide-overcoated indium tin oxide layer 20 deposited on a Corning borosilicate glass substrate 18. A spun and heat-cured polyimide alignment layer 22 provided pretilt angles of between about 3° and 4°. Spacers 26 were of the Morex black spacer type and were sprayed on one glass substrate 18 of each cell 10. Cells 10 were assembled as 90° twist cells. The host liquid crystal material was Merck ZLI 4718 doped with a 0.05 percent concentration of ZLI 3786 chiral additive to prevent reverse twist disclinations. The photocurable polymer precursor was the monomer Desotech DSM 950-044, which was added to the host liquid crystal material of different cells 10 in one percent to five percent concentrations in a semi-dark room with minimum lighting conditions. The resulting doped liquid crystal material was stirred for several minutes in a mechanical shaker, heated until the mixture became isotropic, and stored inside a black box before using. The mixture was thoroughly stirred again before filling the cells 10 under minimal lighting conditions.

Cells 10 were cured with the use of a Tamarack exposure station for five minutes at voltages ranging from zero to 50 volts RMS.

Two control cells of similar construction to that of cell 10 were used as references. The control cells were made with 5.5 μm and 7.5 μm spacings between their electrode structures and filled with a host liquid crystal material with Δn=0.085.

Polymer concentration and curing conditions are two parameters of interest that affect the electro-optic response characteristics of cells 10. With respect to polymer concentration, experiments revealed that 1 percent DSM doped cells showed no electro-optic threshold voltage reduction at any of the curing voltages; 5 percent DSM doped cells showed homeotropic texture at curing voltages as low as 5 volts RMS; and 4 percent DSM doped cells showed electro-optic threshold voltage reductions only at curing voltages of between 5 volts RMS and 10 volts RMS but showed homeotropic texture at curing voltages greater than 10 volts RMS. The 4 percent DSM doped cells cured at 5 volts RMS to 10 volts RMS exhibited scattering when examined under a polarizing microscope. The results obtained with the 2 percent DSM doped cells are set forth below as examples because such cells produced the best and most constant results.

With respect to curing conditions, experiments revealed that cells with curing voltages of greater than 20 volts RMS showed poor contrast immediately after cure but significantly improved contrast when left in the dark. Once they were cured, the cells took at least 72 hours for the directors to relax to the minimum energy configuration and to establish a stable polymer configuration. The relaxation time depended on curing voltage, the cells cured at voltages of greater than 20 volts RMS requiring longer relaxation times.

EXAMPLE 1

This example shows the reduction of electro-optic threshold and saturation voltages resulting from mixing with a liquid crystal material a polymer precursor in the proper concentration and curing it in the presence of a curing electric field produced by a voltage applied across the device.

Figure 3:
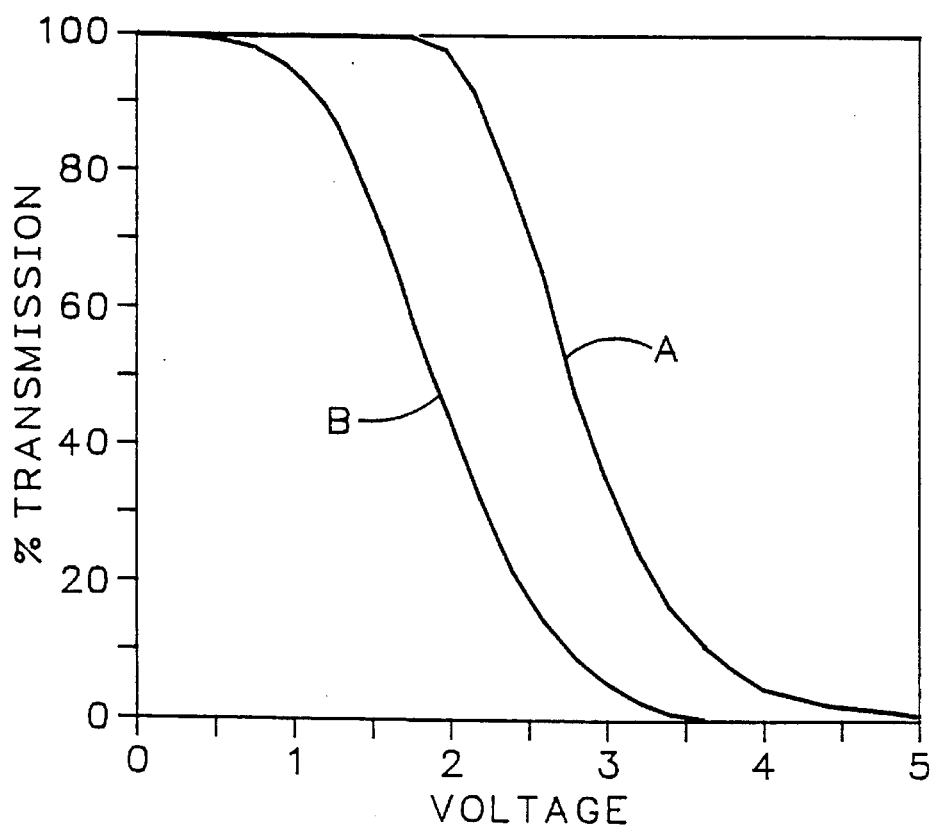
FIG. 3 is a graph showing the comparative relationship of the electro-optic response curves of a standard twisted nematic device and a twisted nematic device fabricated in accordance with the invention.

FIG. 3 shows the comparative relationship of the electro-optic response curves A and B of a twist nematic device respectively before and after it was cured with ultraviolet light and an applied curing electric field. The twisted nematic cell was positioned between crossed polarizers to obtain the optical response curves. The twisted nematic cell was 5.5 μm thick and filled with ZLI-4716 doped with DSM 950-044 in 2 percent concentration and aligned with a Nisson 610 polyimide material.

Curve A represents a higher voltage response, which was obtained before the cell was exposed to the ultraviolet light, and curve B represents a lower voltage response, which was obtained after the DSM 950-044 polymer precursor was cured by the ultraviolet light as 40 volts RMS was applied across the cell. Curves A and B reveal a 1.0 volt reduction in threshold voltage at 10 percent transmission and a 0.8 volt reduction in saturation voltage at 90 percent transmission.

EXAMPLE 2

This example shows the effect on the electro-optic response characteristics and switching speeds of six 6.0 μm cells 10 cured at different curing voltages. These cells were of the twisted nematic type, assembled and filled under identical conditions, and cured from zero volts to 50 volts RMS at 10 volt intervals. Three series of electro-optic measurements were performed on the six cells at 5 days, 9 days, and 19 days after cure. The cells cured at 40 volts RMS and 50 volts RMS showed complete director relaxation between 5 days and 9 days, respectively, after cure and showed no change at 19 days after cure.

Figure 4A:
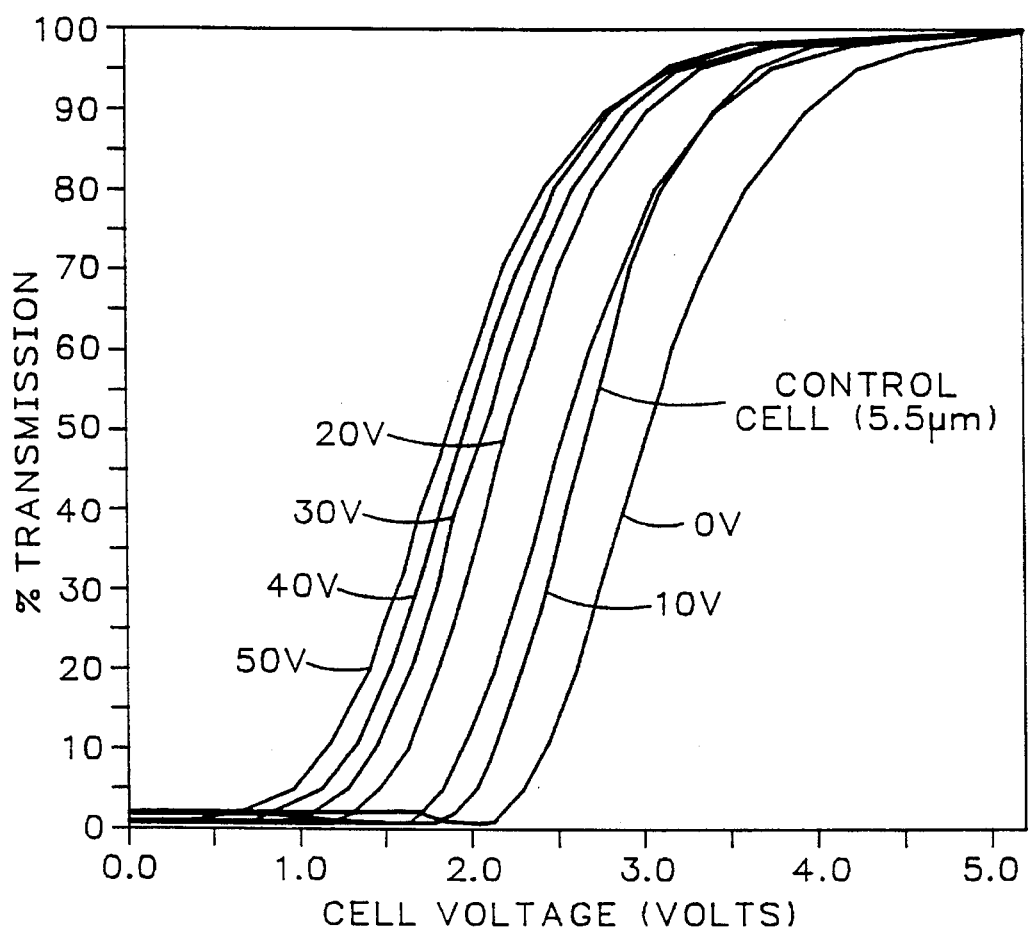
FIGS. 4A and 4B are graphs showing the comparative relationships of the electro-optic responses of twisted nematic cells of different thicknesses fabricated at different curing voltages in accordance with the invention.

FIG. 4A shows the electro-optic response curves of these cells at two months after cure. The cell cured at zero volts had higher threshold and saturation voltages than those of the 5.5 μm control cell filled only with the host liquid crystal material. This demonstrates that the cells needed to receive an applied curing voltage. The cell cured at 10 volts RMS showed an insignificant overall voltage reduction, and the cell appeared to be thicker than a thickness corresponding to the first interference minimum. The cells cured at 20 volts RMS and higher curing voltages showed significant reductions in threshold voltage and saturation voltage. These cells exhibited high contrast and appeared to be at the thickness of the first interference minimum.

The switch-on and switch-off speeds of the six 6 μm cells were measured and are set forth in Table 1 together with their threshold and saturation voltages at room temperature (25° C.). The turn-on ($\tau_{on}$) and turn-off ($\tau_{off}$) response times were measured by, respectively, first applying a 5 volt burst signal to turn on the cell and then causing a short circuit across the cell to turn it off. The cell cured at 50 volts RMS had a slower $\tau_{off}$ response than that of the control cell. As compared to the control cell, the cell cured at zero volts had higher threshold and saturation voltages but a shorter $\tau_{off}$ response.

TABLE 1

| Cell | $V_{10\%}$ (volts) | $V_{90\%}$ (volts) | $\tau_{on}$ (ms) | $\tau_{off}$ (ms) |
|---|---|---|---|---|
| Control | 2.1 | 3.4 | 10 | 14 |
| 0 volt cure | 2.4 | 4.0 | 11 | 11 |

TABLE 1-continued

| Cell | $V_{10\%}$ (volts) | $V_{90\%}$ (volts) | $\tau_{on}$ (ms) | $\tau_{off}$ (ms) |
|---|---|---|---|---|
| 10 V cure | 1.9 | 3.5 | 9.5 | 16 |
| 20 V cure | 1.6 | 3.1 | 10 | 22 |
| 30 V cure | 1.5 | 2.9 | 9.4 | 24 |
| 40 V cure | 1.3 | 2.9 | 8.6 | 28 |
| 50 V cure | 1.2 | 2.8 | 8.6 | 35 |

EXAMPLE 3

This example shows the effect on the electro-optic response characteristics and switching speeds of four 7.5 μm cells 10 cured at different curing voltages. These cells were of the twisted nematic type, assembled and filled under identical conditions, and cured at 10, 30, 45, and 50 volts RMS. Two series of electro-optic measurements were performed on the four cells at one and two months after cure; there was no appreciable change noted.

Figure 4B:
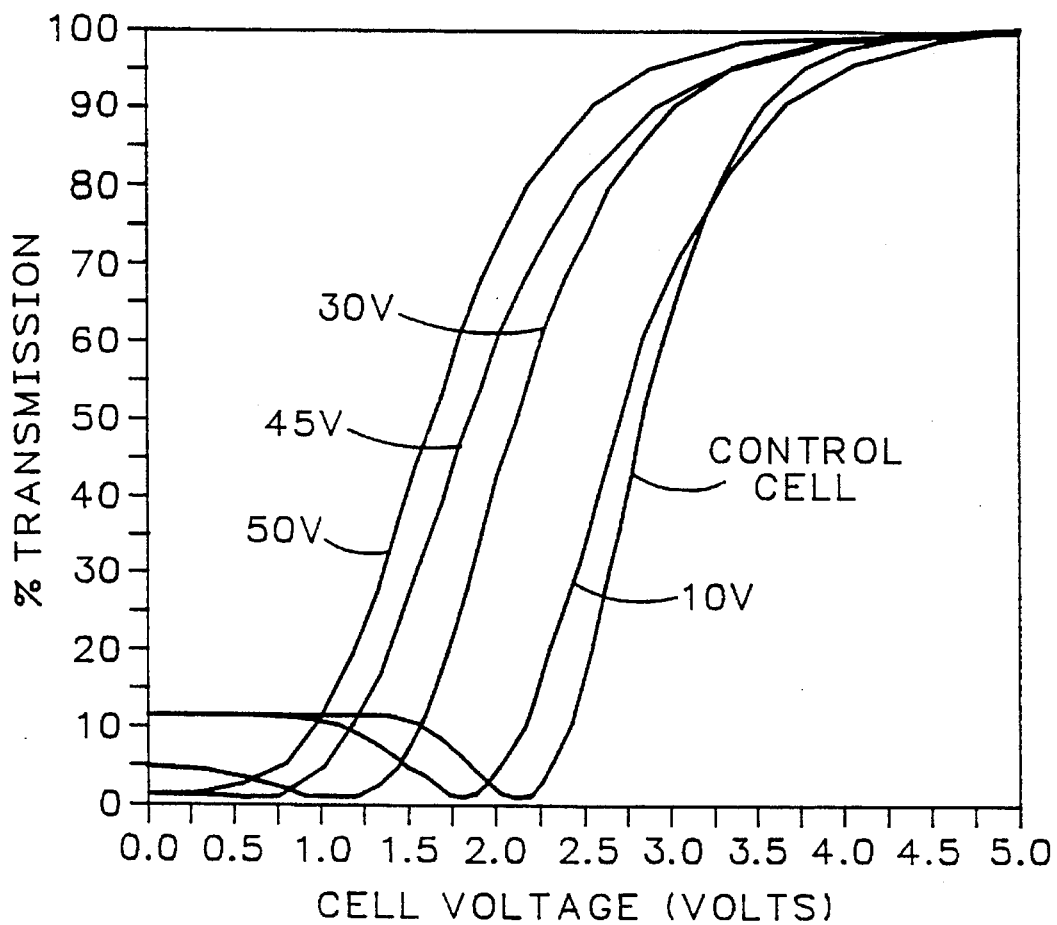

FIG. 4B shows the electro-optic response curves of a 7.5 μm control cell filled only with the host liquid crystal material and the four 7.5 μm cells 10 cured at different curing voltages. The 7.5 μm control cell and the 7.5 μm cell cured at 10 volts RMS show in their electro-optic curves a dip that is characteristic of a cell thickness that is thicker than that of a first interference minimum cell.

The cell cured at 30 volts RMS showed a smaller dip. This cell was tested on four different days within approximately one month after cure and at two months after cure. The cell showed a similar electro-optic response curve for each measurement, thereby indicating that the cell had stabilized to a low energy state. The three remaining 7.5 μm cells cured at the higher voltages appeared to be of a thickness near that of the first interference minimum; however, when their switch-on and switch-off speeds were measured, the cells cured at higher voltages showed slower response times. Inasmuch as the 2 percent polymer concentration is low, it does not appear that the viscosity of the liquid crystal material increased to contribute the slower response times. Table 2 presents the switch-on and switch-off speeds of the four 7.5 μm cells together with their threshold and saturation voltages at room temperature (25° C.).

TABLE 2

| Cell | $V_{10\%}$ (volts) | $V_{90\%}$ (volts) | $\tau_{on}$ (ms) | $\tau_{off}$ (ms) |
|---|---|---|---|---|
| Control | 2.4 | 3.5 | 10.5 | 14 |
| 10 V cure | 2.1 | 3.7 | 12.0 | 17.5 |
| 30 V cure | 1.6 | 3.1 | 10.0 | 30.0 |
| 45 V cure | 1.2 | 3.0 | 8.6 | 48.0 |
| 50 V cure | 1.0 | 2.6 | 8.8 | 58.0 |

EXAMPLE 4

This example shows the decrease in ion effects stemming from the mixing of a polymer in the liquid crystal material.

The presence of ions in the 6.0 μm cells 10 cured at 0, 30, and 50 volts RMS was measured and compared with the 5.5 μm control cells. This was accomplished by measuring the optical droop (i.e., unintended light transmission change) and charge retention of the cells operating as a display. To measure charge retention, an open circuit was caused to appear across the cells during the time between drive pulses. Optical droop is defined as the percentage change in optical transmission over a 16 millisecond interval. Charge retention of the electrical response is defined as the percentage charge retained in the liquid crystal capacitor at the end of a 16 millisecond frame time. The cell driver was designed to provide 32 millisecond bi-polar voltage drive pulses at 60 Hz and to float at high impedance between the drive pulses. The pulse voltage was adjusted so that the average light transmission was 50 percent of maximum transmission. One of the 5.5 μm control cells was exposed to ultraviolet light for five minutes with the use of the Tamarack exposure station.

Table 3 summarizes the optical droop and charge retention data characterizing the liquid crystal capacitor for the 5.5 μm control cells and the 6 μm cells 10.

TABLE 3

| Cell | ultraviolet light exposure | pulse height (volts) | optical droop (%) | charge retention (%) |
|---|---|---|---|---|
| Control | no | 3.6 | 29 | 60 |
| Control | yes | 4.0 | 23 | 60 |
| 6.0 μm cell | yes @ 0 volt | 2.8 | <5 | 95 |
| 6.0 μm cell | yes @ 30 volt | 1.8 | <5 | 95 |
| 6.0 μm cell | yes @ 50 volt | 1.6 | <5 | 92 |

The 5.5 μm control cells showed large optical droop at the 50 percent transmission level and retained less charge than did the 6.0 μm cells. The 5.5 μm control cell exposed to the ultraviolet light showed similar optical droop and charge retention to that of the unexposed 5.5 μm control cell. In contrast, the 6 μm cells 10 showed better charge retention and less optical droop.

The cell cured at 30 volts RMS was used to estimate the resistivity of one of the 6 μm cells. This was accomplished by connecting across the cell a shunt resistor and decreasing its value from 10 MΩ to the beginning point of increase in the optical droop. The 10 MΩ resistor appeared to have a small effect, and a 1.0 MΩ resistor had a large effect. The resistivity of the material is clearly better than ρ=R A/d (where R=1.0 MΩ, d=6.0 μm, and A=3.0×10$^3$m$^2$)=5.0× 10$^8$Ω-m and could be at least an order of magnitude higher. It appears that the resistivity increases significantly after the establishment of the polymer. If any ions are generated in the cells 10 during curing, such ions apparently are either trapped in the polymer or shielded by it at the interface.

It will be obvious to those having skill in the art that many changes may be made to the details of the above-described preferred embodiment of the present invention without departing from the underlying principles thereof. The scope of the present invention should, therefore, be determined only by the following claims.

We claim:

1. A method of fabricating a twisted nematic liquid crystal cell including liquid crystal material contained between a pair of electrode substrate planes and having a low pretilt alignment angle but with an electro-optic threshold that is lower than the characteristic electro-optic threshold of the liquid crystal material and that is comparable to the electro-optic threshold of a twisted nematic cell having a high pretilt alignment angle, the lower electro-optic threshold enabling the use of a lower voltage to drive the cell between electro-optic states, comprising:

adding to the liquid crystal material, to form a mixture thereof, a chiral additive in an amount sufficient to prevent reverse twist disclinations and a curable polymer precursor in a predetermined concentration less than that which causes scattering of light propagating through the liquid crystal material, the predetermined concentration being greater than about one percent and less than about four percent of the mixture and together with the chiral additive cooperating with the liquid crystal material contained within the cell for any applied voltage to maintain uniform director orientation in any plane parallel to the electrode substrate planes;

curing the polymer precursor; and introducing a curing field within the mixture while curing the polymer precursor, the intensity of the curing field cooperating with the mixture to provide for the twisted nematic cell a lower electro-optic threshold than the characteristic electro-optic threshold.

2. The method of claim 1 in which the polymer precursor is of a photocurable type.

3. The method of claim 1 in which the curing field is an electric field.

4. The method of claim 3 in which the electric field is produced by placing across the cell a voltage of between 5 volts RMS and 50 volts RMS.

5. The method of claim 1 in which the liquid crystal cell includes the liquid crystal material contained between two spaced-apart electrodes each of which having an inner surface coated by an alignment layer, the liquid crystal material having directors and the alignment layers causing the directors to form a pretilt angle of between 3° and 5°.

6. The method of claim 5 in which the alignment layer is of a polyimide type.

7. A liquid crystal cell fabricated in accordance with the method of claim 1.

8. The method of claim 1 in which the predetermined concentration of the polymer precursor is about two percent of the mixture.

9. A twisted nematic liquid crystal cell including liquid crystal material contained between a pair of electrode substrate planes and having a low pretilt alignment angle but with an electro-optic threshold that is less than the characteristic electro-optic threshold of the liquid crystal material and that is comparable to the electro-optic threshold of a twisted nematic cell having a high pretilt alignment angle, comprising:

a mixture of liquid crystal material having directors, a chiral additive in an amount sufficient to prevent reverse twist disclinations, and polymer material contained between inner surfaces of the pair of electrode substrate planes, each of the inner surfaces including a layer of alignment material that imparts a low pretilt angle to the liquid crystal directors contacting the alignment material, the layers of alignment material being oriented to form a cell of a twisted nematic type, and the polymer material having a concentration of between greater than about one percent and less than about four percent of the mixture and together with the chiral additive cooperating with the liquid crystal material for any applied voltage to maintain uniform director orientation in any plane parallel to the electrode substrate planes.

10. The cell of claim 9 in which the alignment material is of a polyimide type.

11. The cell of claim 9 in which the pretilt angle is of between 3° and 5°.

12. The cell of claim 9 in which the pretilt angle is less than 10°.

13. The cell of claim 9 in which the polymer material is a polymerized photocurable monomer.

14. The cell of claim 9 in which the concentration of the polymer material is about two percent of the mixture.

* * * * *